United States Patent
Fuhr et al.

(10) Patent No.: US 11,606,952 B2
(45) Date of Patent: Mar. 21, 2023

(54) METHOD AND DEVICE FOR THE TEMPERATURE MONITORING OF A CRYOPRESERVED BIOLOGICAL SAMPLE

(71) Applicant: Fraunhofer-Gesellschaft zur Foerderung der angewandten Forschung e. V., Munich (DE)

(72) Inventors: Guenter R. Fuhr, Berlin (DE); Heiko Zimmermann, Waldbrunn (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1157 days.

(21) Appl. No.: 16/095,549

(22) PCT Filed: Mar. 31, 2017

(86) PCT No.: PCT/EP2017/000403
§ 371 (c)(1),
(2) Date: Oct. 22, 2018

(87) PCT Pub. No.: WO2017/186330
PCT Pub. Date: Nov. 2, 2017

(65) Prior Publication Data
US 2019/0082681 A1    Mar. 21, 2019

(30) Foreign Application Priority Data
Apr. 27, 2016    (DE) .......................... 102016005133.7

(51) Int. Cl.
*G01K 11/00*    (2006.01)
*A01N 1/02*    (2006.01)
(Continued)

(52) U.S. Cl.
CPC ......... *A01N 1/0268* (2013.01); *A01N 1/0236* (2013.01); *G01K 3/04* (2013.01);
(Continued)

(58) Field of Classification Search
CPC ...... G01K 11/06; G01K 2203/00; G01K 3/04; G01K 11/12; G01K 13/006; G01K 11/02;
(Continued)

(56) References Cited

U.S. PATENT DOCUMENTS 1,393,279 A * 10/1921 Gersdorff ............... G01K 13/12
73/864.63
1,917,048 A    10/1931 Midgley, Jr.
(Continued)

FOREIGN PATENT DOCUMENTS

CN    1419512 A    5/2003
CN    1687757 A    10/2005
(Continued)

OTHER PUBLICATIONS

English Abstract for EP 0606033 A1 (1994).
(Continued)

*Primary Examiner* — Gail Kaplan Verbitsky
(74) *Attorney, Agent, or Firm* — Caesar Rivise, PC

(57) ABSTRACT

The invention relates to a device for the temperature monitoring of a cryopreserved biological sample, comprising a sample container (in particular a cryotube) having a holding space for holding a biological sample and comprising at least one chamber, the interior of which is not fluidically connected to the holding space and is filled only partially with an indicator substance, the melting temperature of which lies in a range of −20° C. to −140° C. In particular, the chamber can be formed by a container that is detachably or pivotably fastened to the sample container. Alternatively, the chamber is formed by a double-walled slide-on part or the holding space of the sample container is double-walled, wherein an intermediate space between the inner wall and the outer wall is partially filled with the indicator substance.

22 Claims, 10 Drawing Sheets

(51) Int. Cl.
*G01K 11/06* (2006.01)
*G01K 3/04* (2006.01)

(52) U.S. Cl.
CPC .......... *G01K 11/06* (2013.01); *A01N 1/0284* (2013.01); *G01K 2203/00* (2013.01)

(58) Field of Classification Search
CPC .......... G01K 1/02; G01K 3/005; G01K 1/024; G01K 11/16; G01K 11/18; G01K 11/08; G01K 5/483; G01K 11/14; G01K 2207/04; B01L 2200/143; B01L 2200/147; B01L 2300/021; B01L 2300/0645; B01L 2300/1894; B01L 3/50851; G01N 1/42; G01N 21/0332
See application file for complete search history.

(56) References Cited

U.S. PATENT DOCUMENTS

| | | | |
|---|---|---|---|
| 2,955,942 A | 10/1960 | Fenity et al. | |
| RE25,499 E | 12/1963 | Fenity et al. | |
| 3,290,944 A * | 12/1966 | Altman | G01K 11/26 73/290 V |
| 3,701,282 A | 10/1972 | Peterson | |
| 3,958,528 A | 5/1976 | Hill | |
| 4,134,359 A * | 1/1979 | Redpath | A01N 1/0268 374/E11.006 |
| 4,137,049 A | 1/1979 | Couch et al. | |
| 4,163,427 A | 8/1979 | Cooperman et al. | |
| 4,195,056 A | 3/1980 | Patel | |
| 4,280,361 A | 7/1981 | Sala | |
| 4,501,108 A * | 2/1985 | Johansson | B65B 53/02 53/442 |
| 4,509,449 A | 4/1985 | Chalmers | |
| 4,664,056 A | 5/1987 | Jehanno | |
| 4,844,622 A | 7/1989 | Weiss | |
| 5,034,233 A * | 7/1991 | McCloy, Jr. | G01K 11/06 374/E11.006 |
| 5,057,434 A | 10/1991 | Prusik et al. | |
| 5,102,233 A | 4/1992 | Staerk et al. | |
| 5,152,611 A | 10/1992 | Pieper et al. | |
| 5,182,212 A | 1/1993 | Jalinski | |
| 5,282,684 A | 2/1994 | Holzer | |
| 5,444,989 A | 8/1995 | Gawron et al. | |
| 5,964,181 A | 10/1999 | Pereyra et al. | |
| 6,264,049 B1 * | 7/2001 | Shteynberg | A61J 9/02 215/11.1 |
| 6,913,160 B2 | 7/2005 | Bourreau et al. | |
| 7,097,353 B2 | 8/2006 | Wieder | |
| 7,387,438 B2 | 6/2008 | Parker | |
| 7,415,939 B2 | 8/2008 | Dip | |
| 8,122,844 B2 | 2/2012 | Smith et al. | |
| 8,168,138 B2 * | 5/2012 | Che | B01L 3/50825 436/180 |
| 8,173,388 B2 | 5/2012 | Pasmore et al. | |
| 9,046,292 B2 | 6/2015 | Burke et al. | |
| 9,097,594 B2 | 8/2015 | Rastegar et al. | |
| 9,222,903 B2 | 12/2015 | Crevatin et al. | |
| 9,279,732 B2 | 3/2016 | Parker | |
| 9,296,500 B2 | 3/2016 | Childs et al. | |
| 9,464,973 B2 | 10/2016 | Fuhr et al. | |
| 9,618,398 B2 | 4/2017 | Deng et al. | |
| 10,048,138 B2 | 8/2018 | Smith et al. | |
| 10,408,686 B2 | 9/2019 | Newport et al. | |
| 10,917,941 B2 | 2/2021 | Schryver et al. | |
| 2003/0047477 A1 | 3/2003 | Nygardh et al. | |
| 2006/0078036 A1 | 4/2006 | Wieder | |
| 2007/0098039 A1 | 5/2007 | Parker | |
| 2008/0056329 A1 | 3/2008 | Smith et al. | |
| 2009/0129434 A1 | 5/2009 | Creus et al. | |
| 2012/0027045 A1 | 2/2012 | McLellan et al. | |
| 2012/0175412 A1 | 7/2012 | Grabiner et al. | |
| 2013/0068155 A1 | 3/2013 | Patel | |
| 2014/0318437 A1 | 10/2014 | Hong et al. | |
| 2014/0334520 A1 | 11/2014 | Chen et al. | |
| 2019/0075786 A1 | 3/2019 | Milne et al. | |
| 2019/0113397 A1 | 4/2019 | Fuhr et al. | |
| 2019/0285482 A1 | 9/2019 | Abdo et al. | |
| 2020/0029551 A1 | 1/2020 | Fuhr et al. | |
| 2020/0362292 A1 | 11/2020 | Hoehse et al. | |
| 2021/0010873 A1 | 1/2021 | Aida et al. | |

FOREIGN PATENT DOCUMENTS

| | | | |
|---|---|---|---|
| CN | 1809734 A | 7/2006 | |
| CN | 101198850 A | 6/2008 | |
| CN | 201731955 U | 2/2011 | |
| CN | 102369387 A | 3/2012 | |
| CN | 102379278 A | 3/2012 | |
| CN | 102844649 A | 12/2012 | |
| CN | 102853946 A | 1/2013 | |
| CN | 104501994 A | 4/2015 | |
| CN | 104583741 A | 4/2015 | |
| CN | 103630503 B | 4/2016 | |
| CN | 205175785 U | 4/2016 | |
| CN | 109152354 A | 1/2019 | |
| DE | 74651 A1 | 7/1970 | |
| DE | 2130926 A | 12/1972 | |
| DE | 2504078 A1 | 8/1976 | |
| DE | 8435794 U1 | 3/1985 | |
| DE | 3712201 A1 | 9/1988 | |
| DE | 3716972 A1 | 12/1988 | |
| DE | 3731268 A1 | 4/1989 | |
| DE | 3838661 A1 | 6/1989 | |
| DE | 3940163 A1 | 6/1991 | |
| DE | 19960920 A1 | 6/2001 | |
| DE | 20301688 U1 | 5/2003 | |
| DE | 10203630 A1 | 8/2003 | |
| DE | 20301123 U1 | 3/2004 | |
| DE | 102005041495 A1 | 3/2007 | |
| DE | 102006003995 A1 | 8/2007 | |
| DE | 102006003995 B4 | 4/2008 | |
| DE | 102006045821 A1 | 4/2008 | |
| DE | 102008028334 A1 | 12/2009 | |
| DE | 102008031666 A1 | 1/2010 | |
| DE | 102008031666 B4 | 5/2010 | |
| DE | 102006055331 B4 | 12/2010 | |
| DE | 102010052434 A1 | 5/2012 | |
| DE | 102011010120 A1 | 8/2012 | |
| DE | 102011115467 A1 | 4/2013 | |
| DE | 102012202565 A1 | 8/2013 | |
| DE | 102013108557 B3 | 11/2014 | |
| DE | 102014018308 A1 | 6/2016 | |
| EP | 0606033 A1 | 7/1994 | |
| EP | 1560009 A1 | 8/2005 | |
| EP | 2937850 A1 | 10/2015 | |
| EP | 2984928 A1 | 2/2016 | |
| FR | 2370269 A2 | 6/1978 | |
| FR | 2508164 A1 | 12/1982 | |
| FR | 2641611 A1 | 7/1990 | |
| FR | 2662798 A1 | 12/1991 | |
| FR | 2929705 A1 | 10/2009 | |
| FR | 3013836 A1 | 5/2015 | |
| GB | 2416842 A | 2/2006 | |
| JP | 55-500 A | 1/1980 | |
| JP | 56-1322 A | 1/1981 | |
| JP | S6055235 A | 3/1985 | |
| JP | 60-500460 A | 4/1985 | |
| JP | 4-109336 U | 9/1992 | |
| JP | H05-99754 A | 4/1993 | |
| JP | H07-167716 A | 7/1995 | |
| JP | 2002-323386 A | 11/2002 | |
| JP | 2004-77215 A | 3/2004 | |
| JP | 2006047030 A | 2/2006 | |
| JP | 2008151716 A | 7/2008 | |
| JP | 2008542736 A | 11/2008 | |
| JP | 2009-128137 A | 6/2009 | |
| JP | 2009-524806 A | 7/2009 | |
| JP | 4723497 B2 * | 7/2011 | ......... B65D 50/045 |
| JP | 2012-173282 A | 9/2012 | |
| JP | 2012219017 A | 11/2012 | |
| JP | 6893940 B2 | 6/2021 | |
| KR | 102287882 B1 * | 8/2021 | |

(56) References Cited

FOREIGN PATENT DOCUMENTS

| WO | 9802722 | A1 | 1/1998 | |
|---|---|---|---|---|
| WO | 0047964 | A1 | 8/2000 | |
| WO | 2004077001 | A1 | 9/2004 | |
| WO | WO-2006083892 | A2 * | 8/2006 | ......... A61B 5/14532 |
| WO | 2006128899 | A1 | 12/2006 | |
| WO | 2007012132 | A1 | 2/2007 | |
| WO | 2007039094 | A1 | 4/2007 | |
| WO | 2007054160 | A2 | 5/2007 | |
| WO | 2007085385 | A1 | 8/2007 | |
| WO | 2008027814 | A2 | 3/2008 | |
| WO | 2015078767 | A1 | 6/2015 | |
| WO | 2018185467 | A1 | 10/2018 | |

OTHER PUBLICATIONS

Machine Translation of Abstract for JP 4-109336 U (1992).
English Abstract for JP H07-167716 A (1995).
English Abstract for JP 2012219017 A (2012).
Chinese Office Action with Translation dated Nov. 23, 2020.
Japanese Office Action with Translation dated Nov. 2, 2020.
English Abstract for DE 3940163 A1 (1991).
Machine Translation for JP H07-167716 A (1995).
Chinese Office Action dated Jul. 1, 2021.
DE 3940163 A1, English Abstract.
English Abstract for CN 1687757 A (2005).
English Abstract for CN 201731955 U (2011).
English Abstract for CN 104501994 A (2015).
English Abstract for JP 2002-323386 A (2002).
English Abstract for JP 2004-77215 A (2004).
English Abstract for JP 2009-128137 A (2009).
English Abstract for JP 2012-173282 A (2012).
JP 6893940 B2, English Translation.
English Abstract for CN 103630503 B (2016).
English Abstract for CN 205175785 U (2016).
Machine Translation for DD 74651 A1 (1970).
English Abstract for DE 2130926 A (1972).
English Abstract for DE 2504078 A1 (1976).
English Abstract for DE 3712201 A1 (1988).
English Abstract for DE 3716972 A1 (1988).
English Abstract for DE 3731268 A1 (1989).
English Abstract for DE 3838661 A1 (1989).
Viachine Translation for DE 8435794 U1 (1985).
English Abstract for DE 10203630 A1 (2003).
English Abstract for DE 19960920 A1 (2001).
English Abstract for DE 20301123 U1 (2004).
English Abstract for DE 20301688 U1 (2003).
English Abstract for DE 102005041495 A1 (2007).
English Abstract for DE 102006045821 A1 (2008).
English Abstract for DE 102008028334 A1 (2009).
English Abstract for DE 102008031666 A1 (2010).
English Abstract for DE 102008031666 B4 (2010).
English Abstract for DE 102010052434 A1 (2012).
English Abstract for DE 102011010120 A1 (2012).
English Abstract for DE 102011115467 A1 (2013).
English Abstract for DE 102012202565 A1 (2013).
English Abstract for DE 102013108557 B3 (2014).
English Abstract for DE 102014018308 A1 (2016).
English Abstract for FR 2370269 A2 (1978).
English Abstract for FR 2508164 A1 (1982).
English Abstract for FR 2641611 A1 (1990).
English Abstract for FR 2662798 A1 (1991).
English Abstract for FR 2929705 A1 (2009).
English Abstract for FR 3013836 A1 (2015).
English Abstract for JP S6055235 A (1985).
Machine Translation for JP 2006047030 A (2006).
Machine Translation for JP 2008151716 A (2008).
3M (2006). 3M Monitor Mark. Time Temperature Indicators. Product Literature, 1-4.
Biocision LLC. (2013). Snap freezing using dry ice or liquid nitrogen. Product Literature, 1-2.
Capture of http://www.cryoguard.com/key-information/ retrieved from internet archive on Jun. 21, 2017.
Durst et al. (2007). Management, interchange and reproducible execution of sample preparation knowledge in collaborative research scenarios Proceedings of I-Know '07 Graz, Austria. 111-117.
FreezCube (2008). Screenshot from video at 2:23. FreezCube, Invention Géniale! Youtube. Published at https://www.youtube.com/watch?v=ZjPf7YP5r68 on Sep. 22, 2008.
FreezCube (2010). Le gardien de vos surgelees. Product Literature, 1-13.
Germann et al. (2013). Temperature fluctuations during deep temperature cryopreservation reduce PBMC recovery, viability and T-cell function. Cryobiology, 67, 193-200.
Goodell et al. (2016). Ring test evaluation of the detection of influenza A virus in swine oral fluids by real-time reverse-transcription polymerase chain reaction and virus isolation. The Canadian Journal of Veterinary Research, 80, 12-20.
Ihmig et al. (2006). Cryogenic electronic memory infrastructure for physically related "continuity of care records" of frozen cells. Cryogenics, 46, 312-320.
Ihmig et al. (2009). The technology of the global HIV vaccine research cryorepository. Engineering in Life Sciences, 9 (5), 376-383.
Ihmig et al. GHRC/CAVD-technology: new identification, storage and distribution technologies for vaccine related reagents and specimens, In AIDS Research and Human Retroviruses (M. Liebert ed. 2010). A68-A69.
Ihmig et al. (2013). Frozen cells and bits: cryoelectronics advances biopreservation. IEEE Pulse, 4(5), 35-43.
Meiser et al. (2009). Entwicklung und evaluierung einer mikrosystem-basierten anlage zur kryokonservierung von multizellulaeren aggregaten. Proceedings of Mirosystemtechnik Kongress, Berlin, Germany, Paper 102.
National Institute of Environmental Health Sciences. (2015). Specimen cold chain SOP—processing, transportation & storage temperatures. Product Literature, 1-6.
Partial Translation for FreezCube (2010). Le gardien de vos surgelees. Product Literature, 1-13.
Partial Translation for Pretschner. (2011). Thermotransportsysteme fuer biomedizische anwendungen. Proceedings of Innovationsforum Bio-Logistik, Leipzig, Germany. Powerpoint Presentation, 75-88.
Pitt et al. (2008). 2008 Best practices for repositories: collection, storage, retrieval and distribution of biological materials for research. Cell Preservation Technology, 6(1), 3-58.
Ren et al. (2009). Evaluation of an outside-the-cold-chain vaccine delivery strategy in remote regions of western china. Public Health Reports, 124, 745-750.
Ruedel et al. (2015). Richtlinie zur probenahme und probenbearbeitung: transport von umweltproben unter cryobedingungen. Umwelt Bundesamt, 1-8.
Shirley et al. (2009). A large-scale cryoelectronic system for biological sample banking. Cryogenics, 49, 638-642.
Simione. (2012). A guide for proper cryogenic preservation. Thermo Fisher Scientific, 1-14.
Thermo Fisher Scientific. (2010). Thermo scientific nunc cryobank vials and bank-it tube system. Product Literature, 1-8.
Thermo Fisher Scientific. (2014). Automated sample storage resource guide. Product Literature, 1-24.
Thermo Fisher Scientific. (2015). Thermo scientific sample storage products. Product Literature, 1-18.
Thermo Fisher Scientific. (2016). The anatomy of the a cryogenic tube. Product Literature, 1-8.
WarmMark. (2014). WarmMark Technical Data Sheet. Product Literature, 1-11.
International Search Report of PCT/EP2017/000403 (dated Jul. 11, 2017).
JP 2008151716 A, Machine Translation.
WO 2006128899 A1, English Abstract on p. 1.
WO 2007085385 A1, English Abstract on p. 1.
WO 2015078767, English Abstract on p. 1.

(56) References Cited

OTHER PUBLICATIONS

FreezCube (2010). Le gardien de vos surgeles. Product Literature, 1-13, Patrial Translation.
Meiser et al. (2009). Entwicklung und evaluierung einer mikrosystembasierten anlage zur kryokonservierung von multizellulaeren aggregaten. Proceedings of Mirosystemtechnik Kongress, Berlin, Germany, Paper 102, English Abstract on p. 1.
Pretschner. (2011). Thermotransportsysteme fuer biomedizische anwendungen. Proceedings of Innovationsforum Bio-Logistik, Leipzig, Germany. Powerpoint Presentation, 75-88, Patrial Translation—Slides 9, 10, 11, 12, 13, and 14.
Ruedel et al. (2015). Richtlinie zur probenahme und probenbearbeitung: transport von umweltproben unter cryobedingungen. Umwelt Bundesamt, 1-8, Machine Translation pp. 4-8.
U.S. Appl. No. 16/095,591, filed Oct. 22, 2018.
U.S. Appl. No. 16/095,936, filed Oct. 23, 2018.
U.S. Appl. No. 16/097,111, filed Oct. 26, 2018.
U.S. Appl. No. 16/097,255, filed Oct. 27, 2018.
U.S. Appl. No. 16/097,259, filed Oct. 28, 2018.

\* cited by examiner

| | |
|---|---|
| Ammonia | -77.8 |
| Ethyl alcohol | -114.5 |
| Benzene | +5.5 |
| Bromine | -7.3 |
| Chloroform | -63.5 |
| Diethyl ether | -116.3 |
| Acetic acid | +16.7 |
| Glycerine | -18.0 |
| Isopentane | -160.0 |
| Methyl alcohol | -97.9 |
| Propyl alcohol | -127.0 |
| Quicksilver | -38.9 |
| Carbon disulphide | -111.6 |
| Carbon tetrachloride | -22.9 |
| Toluene | -94.5 |

FIG. 10

METHOD AND DEVICE FOR THE TEMPERATURE MONITORING OF A CRYOPRESERVED BIOLOGICAL SAMPLE

CROSS-REFERENCE TO RELATED APPLICATIONS

This application is a U.S. National Phase Application of PCT/EP2017/000403, filed Mar. 31, 2017, which claims priority to DE 10 2016 005 133.7, filed Apr. 27, 2016, the contents of which applications are incorporated herein by reference in their entireties for all purposes.

BACKGROUND OF THE INVENTION

The invention relates to a method for temperature monitoring of a cryopreserved biological sample. The invention further relates to a device for temperature monitoring of a cryopreserved biological sample.

The low-temperature preservation (cryopreservation) of cells is hitherto the only possibility of stopping vital processes reversibly (maintaining vitality) at a cellular level such that they can restart after warming to physiological temperatures. Cryopreservation has developed by way of large biobanks in recent decades to become an essential element for clinics, pharmaceutical companies, species survival, environmental protection and health provision. Biological material is stored in low-temperature-compatible sample containers (cryogenic containers), e.g. tubes, straws and bags, of various sizes. In the case of cryopreservation, the stored biomaterial is frozen while maintaining the vitality of the sample material, usually at temperatures below −80° C., for living collections below −140° C. to the temperature of liquid nitrogen. The term "cryogenic sample" is also used below for a cryopreserved sample or a sample intended for cryopreservation.

Numerous techniques have been developed for macroscopic samples, such as e.g. blood or tissue, for sample storage at low temperatures. There is a tendency in modern medicine, genetic engineering and biology to increasingly subject small samples to cryopreservation. For example, small suspension volumes (milliliter or below) with suspended cells or groups of cells are frozen. The cryopreservation of cells from in-vitro cultures is primarily carried out in a suspension. However, the majority of biomedically significant cells require a substrate contact for their propagation and proper development. Samples are therefore frozen in the substrate-bound state possibly after cultivation.

The quality of the samples is of decisive importance since they are used for cell therapies in clinics, the development of pharmaceuticals and biotechnological products, as national resources and many other things. The storage time varies from a few days up to decades, with a tendency towards long-term storage. The samples are stored in cooled containers, are usually located in metal drawers and racks, with which they are subjected to temperature fluctuations in the case of new deposits or removals. In the case of living storage (cells, cell suspensions and pieces of tissue), it is not only the uninterrupted cooling chain which plays a vital role, but also the avoidance of large jumps in temperature in the deep cooling phase. Since it is not unknown during removal for cryogenic containers to heat up to temperatures of −80° C. to −20° C., despite the fact they are still frozen, reductions in quality unknowingly arise which not only reduce the value of the sample, but can also lead to life-threatening situations when they are used in the clinical sector. Even if samples have only thawed briefly, it is not possible to see in the refrozen state that they no longer match the original condition. However, it is especially important to not only identify a thawing of the biomaterial, but also to document the exceeding of a threshold temperature in the range between −140° C. and −20° C. Temperature control and documentation for each sample is the requirement, one which has hitherto only seldom been satisfied, and if so, with high technical outlay. One must also remember extensive laboratory tests after thawing which also use valuable sample material and generate costs even in the case of cryogenic samples which have become worthless in the interim.

One object of the invention is thus to provide an improved method for temperature monitoring of a cryopreserved biological sample, with which disadvantages of conventional techniques can be avoided and which is characterized by a simplified execution of the method. A further object is to provide a device for temperature monitoring of a cryopreserved biological sample with which disadvantages of conventional techniques can be avoided.

A further object is to provide a possibility in order to be able to identify from as simple as possible a marker whether a cryogenic sample has been heated above a definable threshold temperature, even if only for a short time. It must be possible to fix the threshold temperature in the range between −20° C. and −140° C. prior to freezing. This should be possible quickly and in a readily apparent manner at each individual cryogenic sample and at thus millions of samples, must not change the biomaterials and should already be carried out in the deep-frozen state. If possible, it should be possible to detect the condition of the sample even in the storage container since every time the sample is removed from and returned to storage, there is the risk of a change in sample of a plurality of samples in the store since entire racks are generally pulled up. The device and the method should be easy to handle, low-temperature-tolerant and adjustable. It must consume no or only a small amount of energy and result in only the smallest of costs since the storage of a biological sample in the cooled state should only cost a few Euros in terms of total outlay. The materials used must also satisfy this requirement.

These objects are achieved by devices and methods of the invention and are explained in greater detail in the following description with partial reference to the figures.

SUMMARY OF THE INVENTION

According to a first aspect of the invention, the stated objects are achieved by a method for temperature monitoring of a cryopreserved biological sample. A device for temperature monitoring of a cryopreserved biological sample is provided to carry out the method.

According to a second aspect of the invention, the device for temperature monitoring of a cryopreserved biological sample should be disclosed and capable of being claimed as the subject matter per se. The embodiments relating to the device, in particular its advantageous embodiment variants, should thus, in order to avoid repetition, be regarded as disclosed as device features in connection with the device and as device features in connection with and according to the method and capable of being claimed as such.

The device for temperature monitoring of a cryopreserved biological sample comprises a sample container with a receiving space (sample reservoir) for receiving a sample, in particular a biological sample. The receiving cavity can contain a cryopreserved sample.

The device further comprises at least one chamber, the inner space of which is not fluidically connected to the receiving space so that the indicator substance cannot come into direct contact with a sample located in the receiving space. The chamber is furthermore filled only partially with an indicator substance, the melting temperature of which at normal pressure, i.e. at 1013.25 mbar, lies in a range from −20° C. to −140° C. The melting temperature can preferably also lie in a range from −20° C. to −100° C.

An additional compartment which can be used as an indicator element as a result of partial filling with the indicator substance is provided by the chamber of the device according to the invention in order to display an undesired exceeding of the threshold temperature.

The sample container is a container which is suitable for cryopreservation, for example, a tube, a straw (also referred to as a seed tube), a bag for blood or stem cell storage, a box or another container which is suitable for cryopreservation. Such containers are correspondingly also referred to as cryogenic tubes, cryogenic straws, cryogenic bags, cryogenic boxes or generally as cryogenic containers.

Cryogenic tubes are also referred to as biobank or cryobank tubes. Cryogenic tubes have a receiving space which forms an inner cavity for receiving a biological sample. The cryogenic tube furthermore normally has a cover for closing off the receiving space. The cover can have an engagement via which the cover can be rotated with a tool. The cryogenic tube can also have a base element which has a marking, e.g. in the form of machine-readable code.

The method further comprises freezing the indicator substance, wherein the chamber for freezing the indicator substance is moved into a first position so that the indicator substance in the liquid state flows into a first partial volume of the chamber and freezes there. Thereafter, in particular before and during the monitoring phase of cryogenic storage, the chamber with the frozen indicator substance is moved into a second position in which melting of the indicator substance, as a result of the influence of gravity, leads to an at least partial change in configuration of the indicator substance in the chamber.

The change in configuration can be an at least partial change in the position of the indicator substance and/or the shape of the indicator substance, e.g. the surface shape. If the indicator substance melts in the second location, it will flow under the influence of gravity into a second partial volume and freeze again there if the temperature falls back below the melting point.

In other words, the indicator substance is frozen in such a geometry or position and the chamber is changed in its position in the deep-frozen state, e.g. at the storage temperature or at least below the fixed threshold temperature or melting temperature of the indicator substance, so that melting of the indicator substance leads, after the change in position, to a visible displacement of the liquid or its delimiting geometry. On the basis of this change of the liquid, which can be e.g. dyed or made clearly apparent in a different manner, it is possible to ascertain immediately by looking or also in a technically automated manner whether the threshold temperature has been exceeded.

According to the method, it is thus possible to store the device, having the sample container with a cryopreserved sample and the at least one chamber with the frozen indicator substance, for cryopreservation, wherein the at least one chamber for temperature monitoring is arranged in the second position on the sample container.

At a later point in time, it is possible to check whether a change in configuration of the frozen indicator substance, e.g. an at least partial displace and/or a change in shape of the indicator substance, has taken place.

If this is the case, it can be concluded that the melting temperature of the indicator substance and thus the threshold temperature to be monitored have been exceeded, in particular even if only for a short time.

One particular advantage of the invention thus lies in the fact that a change in configuration of the indicator substance directly shows whether a cryogenic sample has heated up over a definable threshold temperature, even if only for a short time. This can be ascertained by visual inspection or also in a technically automated manner by means of a correspondingly configured measuring apparatus without the sample having to be removed from the sample container or thawed out.

According to one particularly preferred embodiment, the device can have a plurality of chambers which are filled in each case only partially with an indicator substance, the melting temperature of which lies in a range from −20° C. to −140° C., wherein the indicator substances in the chambers have different melting temperatures. Different temperature threshold values can thus be monitored, wherein each indicator substance is selected and/or its mixture ratio is adjusted so that its melting point corresponds to one of the temperature threshold values to be monitored. This embodiment has the advantage that the achieved temperature intervals which the sample has reached can be more precisely restricted.

Moreover, a chamber wall at at least one point can be transparent or semi-transparent so that it is visible from outside as to whether a change in configuration, e.g. a change in position, of the indicator substance has taken place. The entire chamber wall is preferably embodied to be transparent or semi-transparent.

For the purpose of improved detectability, the indicator substance can contain an indicator additive which improves detectability of a physical property of the indicator substance. The indicator additive can be, for example, a dye so that the indicator substance is colored or dyed, i.e. not transparent, and thus its shape and/or location is optically better apparent.

In principle, any dye which satisfies at least the following conditions is possible as a dye:
- intensive dyeing capacity even in small quantities and concentrations (e.g. starting from a saturated dye solution addition in the range <1% by volume, generally in the parts-per thousand or sub-parts-per-thousand range).
- frost-tolerant
- lightfast at the dispatch temperatures and also the relevant low temperatures
- soluble in all components of the indicator substance
- no separation during freezing
- no reaction with plastic materials which come into contact with the indicator substance.

The dye is preferably selected from the group which comprises triphenylmethane dyes, rhodamine dyes, in particular xanthene, azo dyes as well as phenazine and phenothiazine dyes.

In more specific embodiments, the dye is selected from the group which comprises oil red, methyl red, brilliant green, rhodamine B, neutral red, methylene blue or other dyes which are used to dye cells in cytology.

The indicator additive can be particles, in particular nanoparticles which increase a scattering action and/or polarization action of the indicator substance for electromagnetic radiation striking the indicator substance. As a result, a change in configuration of the indicator substance can be detected more reliably by means of optical transmission measurement, scattering measurement and/or polarization measurement. The indicator additive can be conductive particles. The conductivity or impedance of the indicator substance can be influenced by adding conductive particles. In this manner, a change in configuration of the indicator substance can be detected by means of a conductivity measurement or impedance measurement.

According to one preferred embodiment, the device can have a measuring apparatus which is formed to detect a location of the indicator substance in the chamber. The measuring apparatus can be an optical or optical-electric measuring apparatus in order to ascertain a change in configuration of the indicator substance e.g. with an optical transmission, scattered light or reflection measurement.

A substance, the melting temperature of which corresponds to a predetermined threshold temperature, the exceeding of which should be monitored, can be selected as the indicator substance. The indicator substance is a liquid or a mixture of different liquids, the melting point of which corresponds to the desired threshold temperature. Merely by way of example, a mixture of water ($H_2O$) and ethanol ($C_2H_6O$), a mixture of water ($H_2O$) and potassium hydroxide (KOH) or a mixture of water and an antifreeze can be selected as the indicator substance. The mixture ratio is adjusted according to the respective melting diagram which indicates the profile of the melting point as a function of the mixture ratio so that the melting point of the liquid mixture has the desired value, namely the threshold temperature to be monitored.

According to one preferred embodiment, the indicator substance comprises at least one alcohol which is selected from the group which comprises octan-1-ol, nonan-1-ol, propane-1,2-diol, propane-1,3-diol, butane-1,2-diol, butane-1,3-diol, butan-2-ol, pentane-1,5-diol, pentan-1-ol, cyclopentanol, benzyl alcohol. The at least one alcohol is particularly preferably selected from propane-1,3-diol, propane-1,2-diol and butan-2-ol.

According to another preferred embodiment, the indicator substance comprises at least two different alcohol components:

a) an alcohol selected from the group which comprises octan-1-ol, nonan-1-ol, propane-1,2-diol, propane-1,3-diol, butane-1,2-diol, butane-1,3-diol, butan-2-ol, pentane-1,5-diol, pentan-1-ol, cyclopentanol, benzyl alcohol;

b) an alcohol selected from the group which comprises octan-1-ol, nonan-1-ol, propane-1,2-diol, propane-1,3-diol, butane-1,2-diol, butane-1,3-diol, butane-2-ol, pentane-1,5-diol, pentan-1-ol, cyclopentanol, benzyl alcohol with a lower melting point than the alcohol of component a);

wherein the mixing ratio of components a) and b) are adjusted so that the melting temperature of the mixture lies within a temperature range from −20° C. to −160° C., in particular from −25° C. to −160° C. or −50° C. to −150° C.

More specific embodiments are characterized in that the indicator substance comprises one of the following combinations of components a) and b):

octan-1-ol and butan-2-ol in a mixture ratio of 5% to 95% by volume;

octan-1-ol and pentan-1-ol in a mixture ratio of 5% to 95% by volume;

octan-1-ol and propane-1,2-diol in a mixture ratio of 5% to 95% by volume;

nonan-1-ol and butan-2-ol in a mixture ratio of 5% to 95% by volume;

nonan-1-ol and propane-1,2-diol in a mixture ratio of 5% to 95% by volume;

nonan-1-ol and pentan-1-ol in a mixture ratio of 5% to 95% by volume;

propane-1,2-diol and butan-2-ol in a mixture ratio of 5% to 95% by volume;

propane-1,2-diol and propane-1,3-diol in a mixture ratio of 5% to 95% by volume;

propane-1,2-diol and butane-1,2-diol in a mixture ratio of 5% to 95% by volume;

propane-1,3-diol and butan-2-ol in a mixture ratio of 5% to 95% by volume;

propane-1,3-diol and butane-1,2-diol in a mixture ratio of 5% to 95% by volume;

pentane-1,5-diol and butan-2-ol in a mixture ratio of 5% to 95% by volume;

benzyl alcohol and butan-2-ol in a mixture ratio of 5% to 95% by volume;

pentan-1-ol and butan-2-ol in a mixture ratio of 5% to 95% by volume;

pentan-1-ol and methanol in a mixture ratio of 5% to 95% by volume;

cyclopentanol and butan-2-ol in a mixture ratio of 5% to 95% by volume;

cyclopentanol and propane-1,2-diol in a mixture ratio of 5% to 95% by volume;

cyclopentanol and pentan-1-ol in a mixture ratio of 5% to 95% by volume;

cyclopentanol and butane-1,2-diol in a mixture ratio of 5% to 95% by volume;

wherein the indicated value of the mixture ratio relates in each case to the ratio of the former component in the mixture of both components.

According to particularly preferred embodiments, this indicator mixture comprises, for example, propane-1,2-diol and butan-2-ol in a mixture ratio of 40% to 60% by volume (produces a melting temperature of approx. −90° C.), propane-1,2-diol and propane-1,3-diol in a mixture ratio of 30% to 70% by volume, or propane-1,3-diol and butan-2-ol in a mixture ratio of 30% to 70% by volume.

The indicator substance preferably also comprises, in addition to the at least one alcohol, at least one dye as described above. This dye is particularly preferably selected from the group which comprises oil red, methyl red, brilliant green and rhodamine B.

An even more specific embodiment is characterized in that the indicator substance comprises two alcohols a) and b), which are selected from propane-1,3-diol, propane-1,2-diol and butan-2-ol, preferably in a mixture ratio as indicated above, as well as a dye which is selected from the group which consists of oil red, methyl red, brilliant green and rhodamine B.

The concentration of the dye in the alcohol component can vary greatly depending on the dye and alcohol.

In the case of intensive coloring, the concentration should generally be kept as low as possible so that the dye molecules do not change the freezing and melting properties of the alcohols in which they are dissolved or increase their viscosity. The dye concentration typically lies in a range of <10% by volume, in particular <1% or <0.1%, i.e. in the percent or parts per thousand or sub-parts per thousand range.

In one variant of the present invention, the threshold temperature to be monitored does not correspond directly to the melting temperature of the indicator substance, but rather that temperature above the melting temperature at which the viscosity of the melted substance has reduced to such an extent that the required liquid transport can take place.

This temperature is also referred to here as the threshold temperature and typically lies in a temperature range of 3-30° C. or 5-30° C., for example, 3-10° C., 3-20° C., 5-10° C. or 5-20° C., above the nominal melting temperature.

In one advantageous embodiment, the indicator substance is therefore characterized in that the liquid mixture in a temperature range of 3-30° C. or 5-30° C. above the melting temperature has a viscosity in a range from 10 to $10^6$ mPa*s, preferably 10 to $10^4$ mPa*s.

The at least one chamber of the device can be formed by a container with one or more cavities which can be and/or is/are arranged on the outside of the sample container. The term "can be and/or is/are arranged" should comprise "can be and/or is/are fastened", "can be and/or is/are coupled", "can be and/or is/are connected". The container for the formation of the at least one chamber which is partially filled with indicator substance can thus be differentiated from the sample container.

One possibility of the realization according to the invention provides that the container for the formation of the at least one chamber is fastened detachably to the sample container. A detachable fastening should in particular also encompass sliding or pushing the container onto the sample container. This has the advantage that the container can be stored and prepared (e.g. freezing the indicator substance in the first location) spatially separate from the sample container.

According to a further embodiment, the at least one chamber can be formed by a container with one or more cavities which is fastened pivotably to the sample container. The pivotability has the advantage that the container can be moved directly on the sample container into two different positions in order to freeze the indicator substance in a first position and subsequently store it in the second position for temperature monitoring.

According to one advantageous variant of this embodiment, the container is fastened pivotably to a longitudinal end of the sample container. This enables advantageous use of the available space, in particular when storing a plurality of such sample containers in cryobanks.

A low-cost pivoting mechanism which is particularly easy to handle can be provided if the container is fastened pivotably to the sample container by means of a bendable part.

The sample container can have a cover for closing off the receiving space, e.g. in order to prevent a contamination of the biosample stored in the receiving space. It is possible within the context of the invention to fasten the container for the formation of the at least one chamber detachably or pivotably to the cover of the sample container. This has, on one hand, the advantage that only the covers of conventional cryogenic containers for receiving the container with the indicator substance must be expediently adapted, and, on the other hand, the advantage that the loading of the sample container with a biological sample can be carried out separately in terms of space and time from the freezing of the indicator substance(s) in the container and the attachment of the container to the cover of the sample container.

For as space-saving as possible arrangement of the container on the sample container, the container according to a further variant can be fastened pivotably to the sample container about an axis of rotation which is perpendicular to a longitudinal axis of the sample container.

The container fastened pivotably to the sample container for the formation of the at least one chamber can be embodied, for example, as a semi-annular or annular hollow body and be moved into a first pivot position, in which it is arranged coaxially with respect to a longitudinal axis of the sample container, and into a second pivot position rotated by at least 45°, preferably by 90°, with respect to the first pivot position. The first pivot position can be a horizontal position. The second pivot position can be a vertical position. This variant is particularly advantageous in the case of cylindrical sample containers, such as e.g. a cryogenic tube, if the container is fastened pivotably to a longitudinal end of the sample container. A particularly compact embodiment of the device can be realized if a diameter of the semi-annularly or annularly embodied container corresponds to the diameter of the cylindrical sample container since the lateral surfaces of sample container and container in the first pivot position can be positioned coaxial to and flush with one another.

The terms "annular" or "semi-annular" should in particular also encompass flat annular forms or flat semi-annular forms, i.e. annular forms and semi-annular forms with lower and upper flat sides. According to a further embodiment variant, one side of the semi-annular or annular container can be mirrored on its inner side. This enables a simple detection of a change in position of the indicator substance with the aid of a measurement beam of a measuring apparatus. For example, the measurement beam can be directed at the inner space of the transparent or semi-transparent container so that the measurement beam only strikes a mirrored inner surface and is reflected by it if the indicator substance has changed its position as a result of a melting process. If the indicator substance has not changed its position, the measurement beam is in contrast absorbed by the indicator substance.

The container fastened pivotably to the sample container for the formation of the at least one chamber can furthermore be a longitudinal hollow body, e.g. in the form of a tube, which is fastened pivotably at a longitudinal end of the sample container indirectly or directly to the sample container.

The pivotable fastening of the container to the sample container can furthermore be embodied so that the container can be moved into a first pivot position in which a longitudinal axis of the container runs parallel to a longitudinal axis of the sample container, and into a second pivot position which is rotated by at least 45° in comparison with the first pivot position. This embodiment variant is particularly suitable for an optical detection of the position and/or form of the indicator substance in the container.

It was already mentioned above that the container containing the indicator substance(s) can also be fastened detachably to the sample container. One possible embodiment for this provides embodying the container or the at least one chamber as a double-walled push-on part. This enables rapid attachment to a sample container which can be embodied in a conventional manner. The push-on part can furthermore be glued onto the sample container.

According to a first variant of this embodiment, the double-walled push-on part can be a double-walled cap which can be pushed onto the sample container at a longitudinal end of the sample container. This variant further enables a quick visual check for a change in form or position of the indicator substance without the sample container having to be removed from its storage.

According to a second variant, the double-walled push-on part can be pushed or slid onto an outer casing surface of the sample container and at least partially engages around it in the pushed-on state. This variant is particularly advantageous for cylindrical sample containers, in particular cryogenic tubes. The double-walled push-on part can be embodied as a hollow cylinder or partial hollow cylinder, the inner diameter of which corresponds to the outer diameter of the sample container so that the push-on part engages around the cylindrical sample container in the manner of a collar or clamp.

According to a further embodiment of the invention, the at least one chamber can be integrated into the sample container itself, i.e. the sample container itself can have, in its interior, such a chamber or several. As a result of this, a separate component arranged on the outside of the sample container for the formation of the at least one chamber can be omitted. For example, the receiving space of the sample container for the formation of the at least one chamber can be embodied to be double-walled with an inner wall and an outer wall, wherein an intermediate space between the inner wall and the outer wall is partially filled with the indicator substance. For the formation of several chambers, the intermediate space can be divided by separating walls into sub-spaces.

The term sample container refers in particular to a container configured for cryopreservation. The sample container is preferably produced using low-temperature-compatible plastic material for temperatures below $-140°$ C. The plastic material can tolerate repeated temperature changes without change and without damage. A plastic material is preferably used, the water absorbing capacity of which is <1% of the net mass, in particular <0.1% of the net mass. Cryogenic storage elements according to the invention are based, for example, on polyurethane or polyethylene.

The term "biological sample" refers to biological material such as cells, tissue, cell components, biological macromolecules, etc. which are subjected to cryopreservation in the sample container, where applicable, in a suspension and/or in combination with a substrate material. A substrate which is configured for adherent receiving of biological cells which are part of the biological sample can thus be arranged in the receiving space.

BRIEF DESCRIPTION OF THE DRAWINGS

The preferred embodiments and features of the invention described above can be combined with one another. Further details and advantages of the invention are described below with reference to the enclosed drawings. In the drawings:

FIG. 10 shows a mixability matrix of solvents.

DETAILED DESCRIPTION OF PREFERRED EMBODIMENTS

Figure 1:
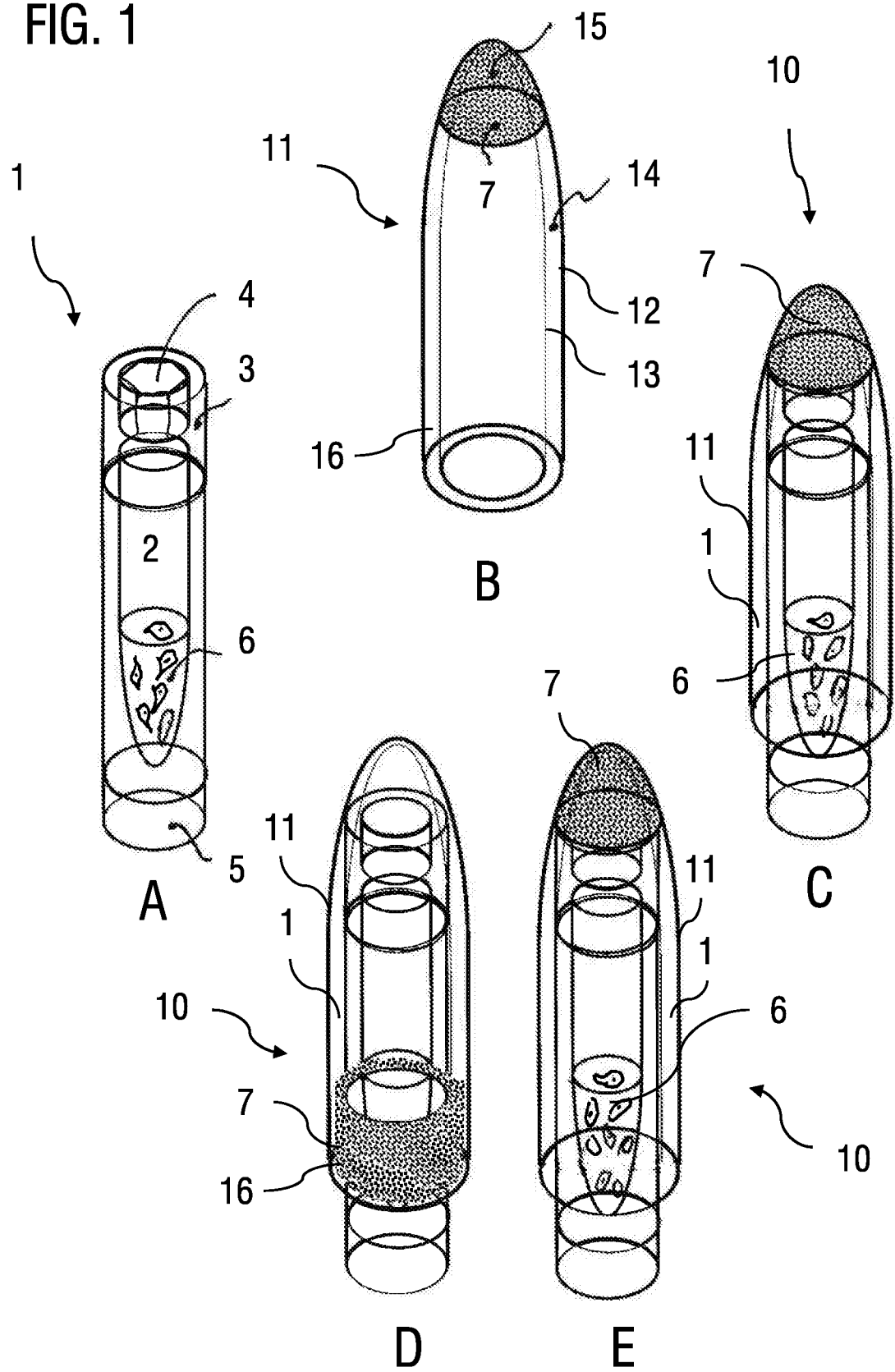
FIGS. 1-6 show schematic views of various exemplary embodiments of a device for temperature monitoring of a cryopreserved biological sample.

Identical elements or functionally equivalent elements are designated by the same reference numbers in all the figures and are partially not described separately.

FIG. 1A shows a sample container in the form of a typical cryogenic tube (tube) 1, as is used in cryogenic biobanks. It generally comprises a receiving volume 2 for the biosample in which the biomaterials are located. The biosample here is a cell suspension 6. The cryogenic tube further comprises a cover 3 which closes off the vessel and at the top has an engagement 4 via which cover 3 can be turned with a tool (not shown) in the case of automation. These cryogenic tubes 1 can also contain a base 5 into which a barcode square or another mark is optionally inserted. In this form, usually standing perpendicular in receptacles, cryogenic tubes 1 are stored in the low-temperature containers.

Figure 10:
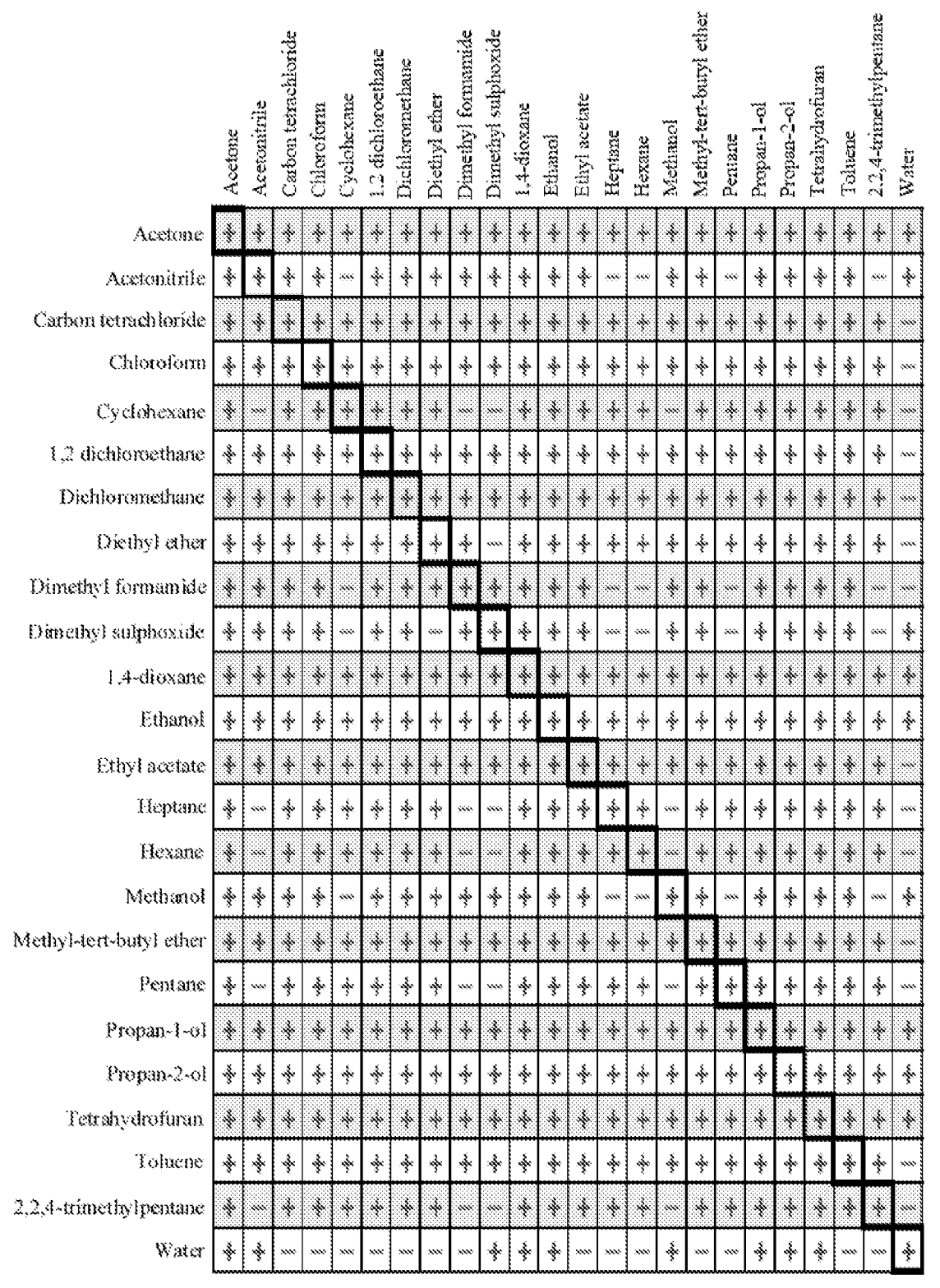

According to the embodiment shown in FIG. 1, a double-walled transparent cap 11 in the deep-cooled state is pushed onto cryogenic tube 1. Cap 11 is represented in FIG. 1B. Double-walled cap 11 has an inner wall 13 and an outer wall 12. The wall volume or intermediate space 14 between inner wall 13 and outer wall 12 is partially filled with an indicator substance 7 in the form of a liquid or a liquid mixture, the freezing point/melting point of which in the range from $-20°$ C. to $-100°$ C. is selected via the mixture ratio. This is also explained in greater detail below on the basis of FIGS. 8 to 10.

Cap 11 is, in a first position which is rotated by 180° with respect to the rotational position of cap 11 shown in FIG. 1B, cooled below this threshold temperature so that the liquid runs under the influence of gravity within intermediate space 14 into cap tip 15 and freezes there. Cap 11 can now be rotated and shows the image represented in FIG. 1B. Indicator substance 7 is solidly frozen in cap tip 15.

In the case of a temperature below the freezing point/melting point of indicator substance 7, cap 11 is then pushed from above onto cryogenic tube 1 as shown in FIG. 1C. Device 10 formed in this manner for temperature monitoring can thus be cryogenically stored, e.g. in a cryogenic tank.

Should sample 6 and thus also indicator substance 7 at some point reach a temperature range above the melting point of indicator substance 7, melted indicator substance 7 in wall volume 14 flows downwards and collects in a lower cap region 16. The image shown in FIG. 1D is produced. If sample 16 has been kept under the freezing point of indicator substance 6 at all times, instead the state as shown in FIG. 1E is produced. In this manner, an inadmissible heating of sample 6 is easily apparent. The position of the indicator substance within cap 11 can be optically detected optoelectrically and in an automated manner by appearance, but also by means of an expediently formed measuring apparatus. If indicator substance 7 is dyed, this facilitates determination of the position. The determination of the position of the indicator substance can also be carried out very easily in the cooling tanks at the storage temperature. A further advantage of device 10 is the reusability of caps 11 and the use of marker liquids used as indicator substance 7 with a freely selectable freezing point. For living racks, a melting temperature around $-80°$ C. is recommended since here a clear recrystallisation of the ice in the cells and around these occurs which leads to a reduction in quality of the cryogenic sample. For biological liquids and storage of genetic material which is stored at $-80°$ C., a melting point around $-30°$ C. is to be recommended.

Figure 2:
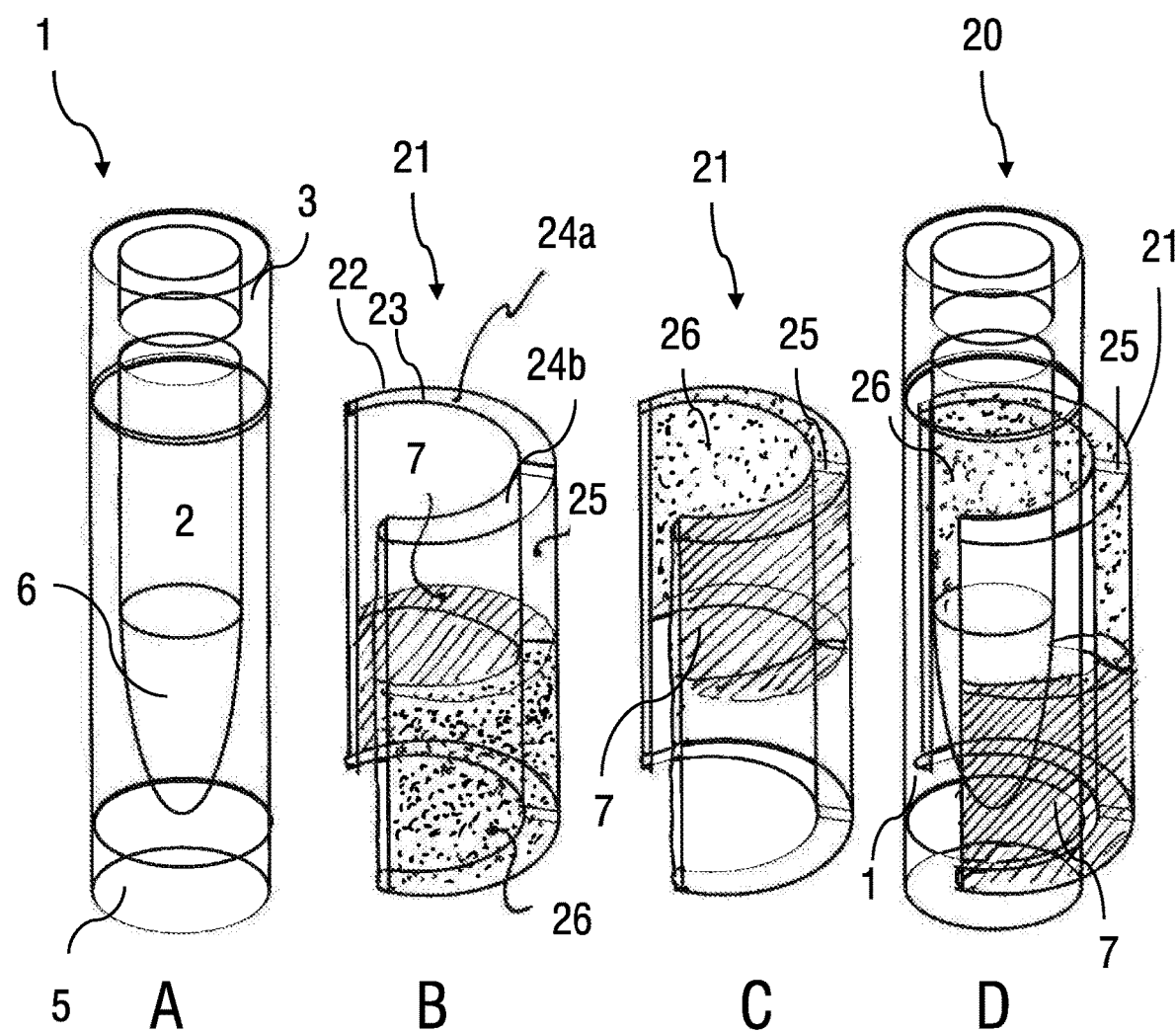

FIG. 2 shows views of a modified two-phase-variant in the form of a part 21 which can be pushed on and is composed of a transparent material, shown in FIG. 2B, which as shown in FIG. 2D can be pushed onto a cryogenic tube 1, as shown in FIG. 2A.

Push-on part 21 is in turn embodied to be double-walled with an inner wall 23 and an outer wall 22 for the formation of a wall volume 24. Wall volume 24 is divided by a separating wall 25 into two partial volumes 24a and 24b which are separate from one another. The push-on part thus forms two chambers 24a, 24b. Chamber 24a is partially filled with a first indicator substance 7, chamber 24b is partially filled with a second indicator substance 26. Indicator substances 7, 26 have different melting points. These are brought under their freezing points in a first position, shown in FIG. 1B, and solidify. Push-on part 21 rotated by 180° is then pushed onto frozen cryogenic tube 1. The device comprising cryogenic tube 1 and pushed-on push-on part 21 is designated by reference number 20. Push-on part 21 is adapted to the dimensions of cryogenic tube 1 so that it can be pushed onto a casing surface of the cryogenic tube and engages around it.

If a liquid with a freezing point around −80° C. was selected as first indicator substance 7 and a liquid with a freezing point around −60° C. was selected as second indicator substance 26 and cryogenic tube 1 together with push-on part 21 was taken to a temperature above −80° C., but below −60° C. in the course of its storage during one of the removal and renewed storage processes or in the tank, the image represented in FIG. 2D is produced. Indicator substance 26 was temporarily melted and flowed into the lower region of wall volume 24b, while indicator substance 7 is still located in the upper region of the wall volume 24a. In this manner, the change in the storage temperature can thus be restricted. Had device 20 been heated at least temporarily above −60° C., both indicator substances 7, 26 would be located in the lower volume of the push-on part (not represented). If the sample has been correctly stored, push-on part 21 exhibits the image represented in FIG. 1C.

Figure 3:
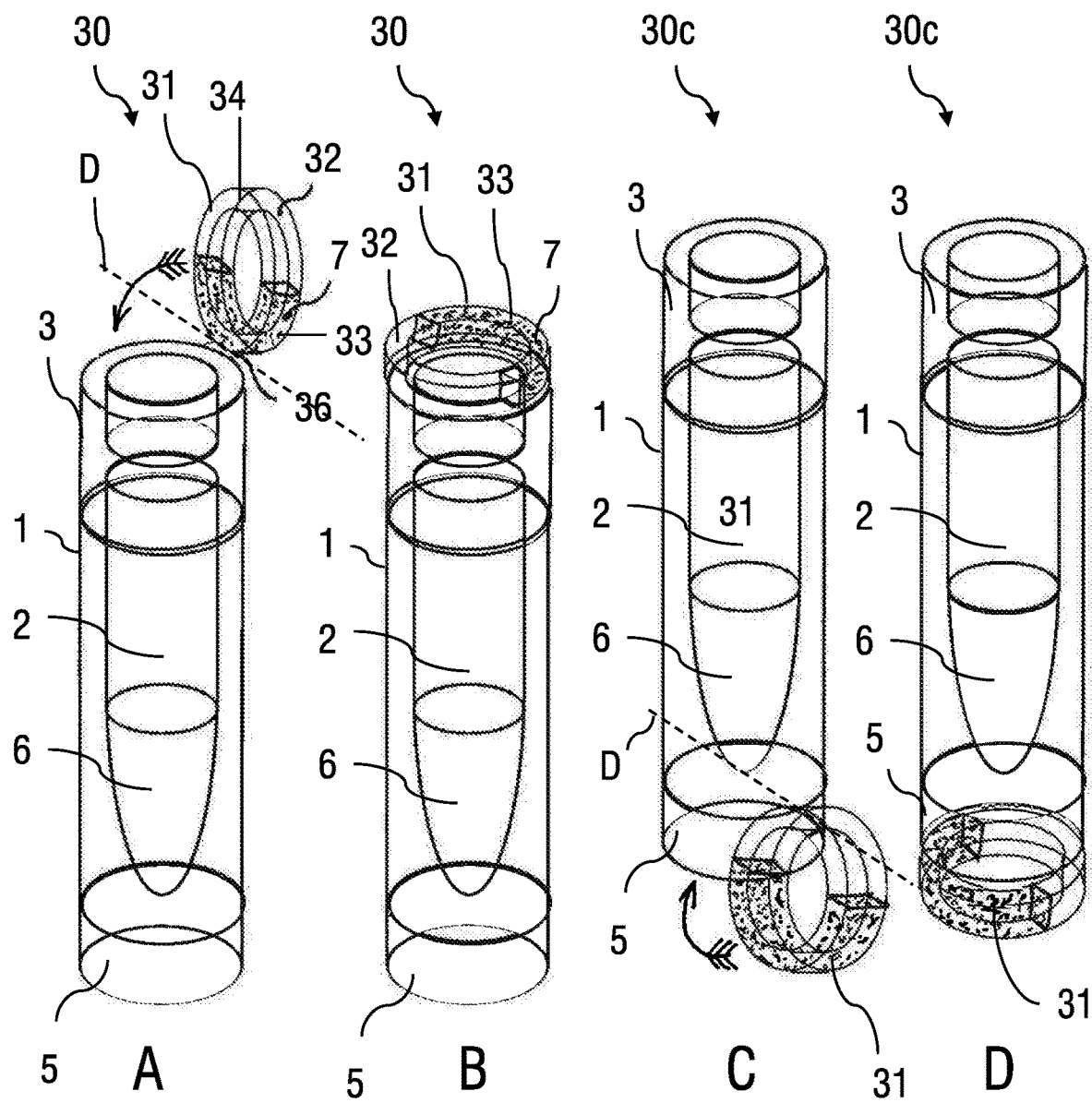

FIG. 3 shows two variants of a partially liquid-filled double-walled transparent annular body 31, which forms an inner volume 34 for receiving an indicator substance 7 and which is fastened pivotably to a cryogenic tube 1. In the case of the variant shown in FIGS. 3A and 3B of device 30, annular body 31 is fastened pivotably to cover 3 of cryogenic tube 1. In the case of the variant shown in FIGS. 3C and 3D of device 30c, annular body 31 is fastened pivotably to base 5 of cryogenic tube 1. Pivot axis D runs perpendicular to a longitudinal axis of cryogenic tube 1. The annular body can be pivoted into a vertical position, as represented in FIGS. 1A and 1C, and into a horizontal position, as represented in FIGS. 1B and 1D.

Device 30 or 30c composed of cryogenic tube 1 and annular body 31 is frozen in each case with a mounted ring (vertical position), as is shown in FIG. 1A and FIG. 1C. Indicator liquid 7 solidifies in a partial volume 33 in the lower half of annular body 31. It is hereby emphasized that the indicator substance does not, as shown, have to occupy half the inner annular volume, but rather can lie above it or below it. After solidification of indicator liquid 7, annular body 31 is rotated at an adhesion part 36 into the horizontal position, as shown in FIG. 1B and FIG. 1D. As long as this image is maintained, device 30, 30c or sample 6 stored therein has not been heated to be warmer than the melting point of indicator liquid 7. Otherwise, the liquid has spread and is thus also located partially in partial volume 32, which can be ascertained by visual inspection or also by optical measurements.

Figure 4:
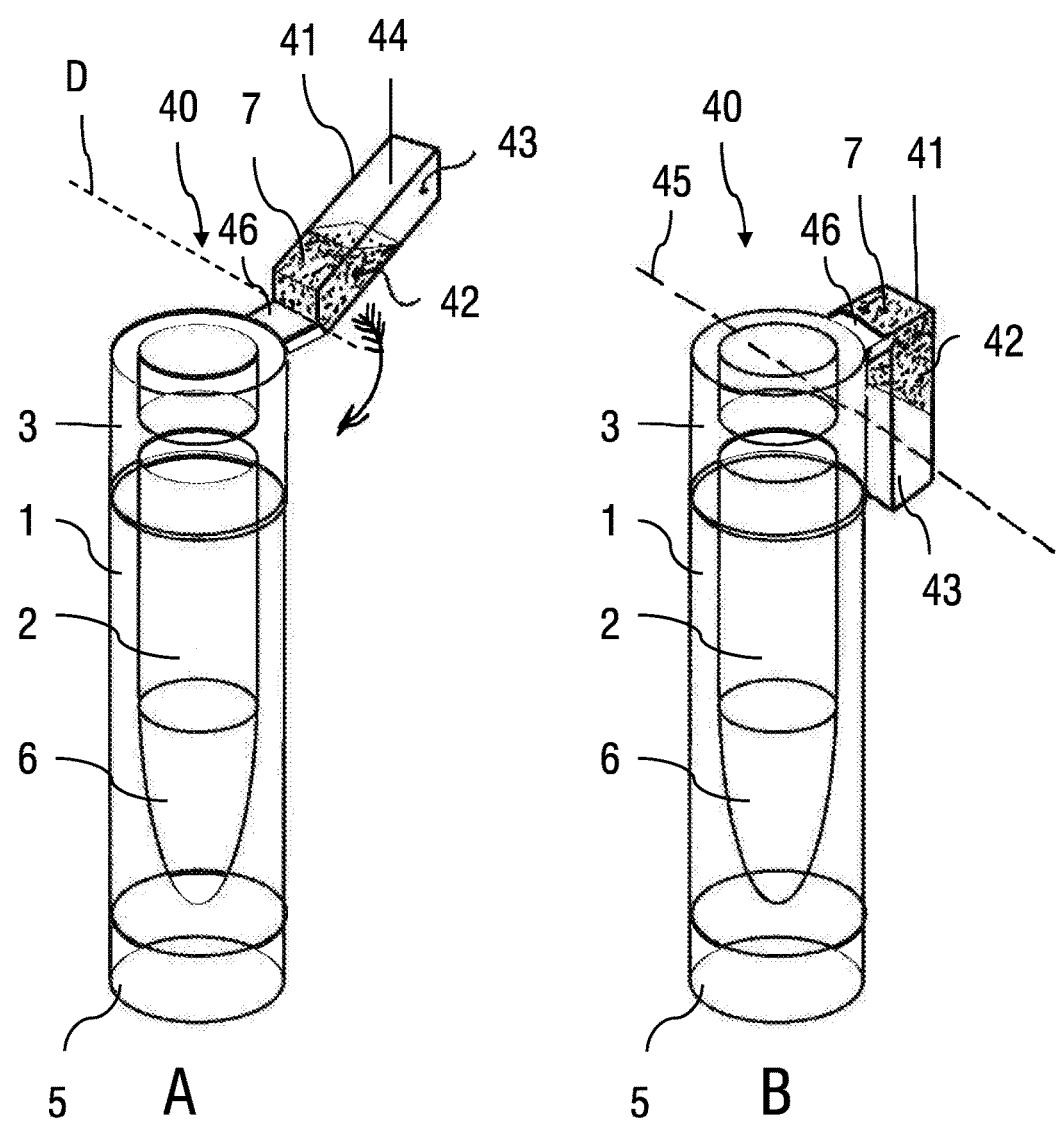

FIG. 4 shows a further exemplary embodiment in the case of which an elongated container 41, inner volume 44 of which is filled partially with indicator substance 7, is fastened pivotably to a cryogenic tube 1 about axis of rotation D. Indicator substance 7 is frozen in the case of an oblique or also perpendicular position of container 41. Container 41 with frozen indicator substance 7, as shown in FIG. 4B, is subsequently bent downwards. To this end, the container is fastened via a bending part 46 to cryogenic tube 1. As long as indicator substance 7 remains frozen in upper partial volume 42, the melting temperature has not been exceeded. If device 40 is thus found in the state shown in FIG. 4B after cryogenic storage, it can be concluded that the melting temperature of the indicator substance was not exceeded. Said device 40 is particularly well suited to optical detection. It is thus possible to check with a measuring apparatus (not represented), measurement beam path 45 (dashed line) of which is directed at the lower partial volume 43 of transparent container 41, whether indicator substance 7 became liquid as a result of a melting process and as a result flowed into lower partial volume 43. In this case, measurement beam 45 is absorbed by the indicator substance, which can be detected by an interruption of measurement beam 45.

Figure 5:
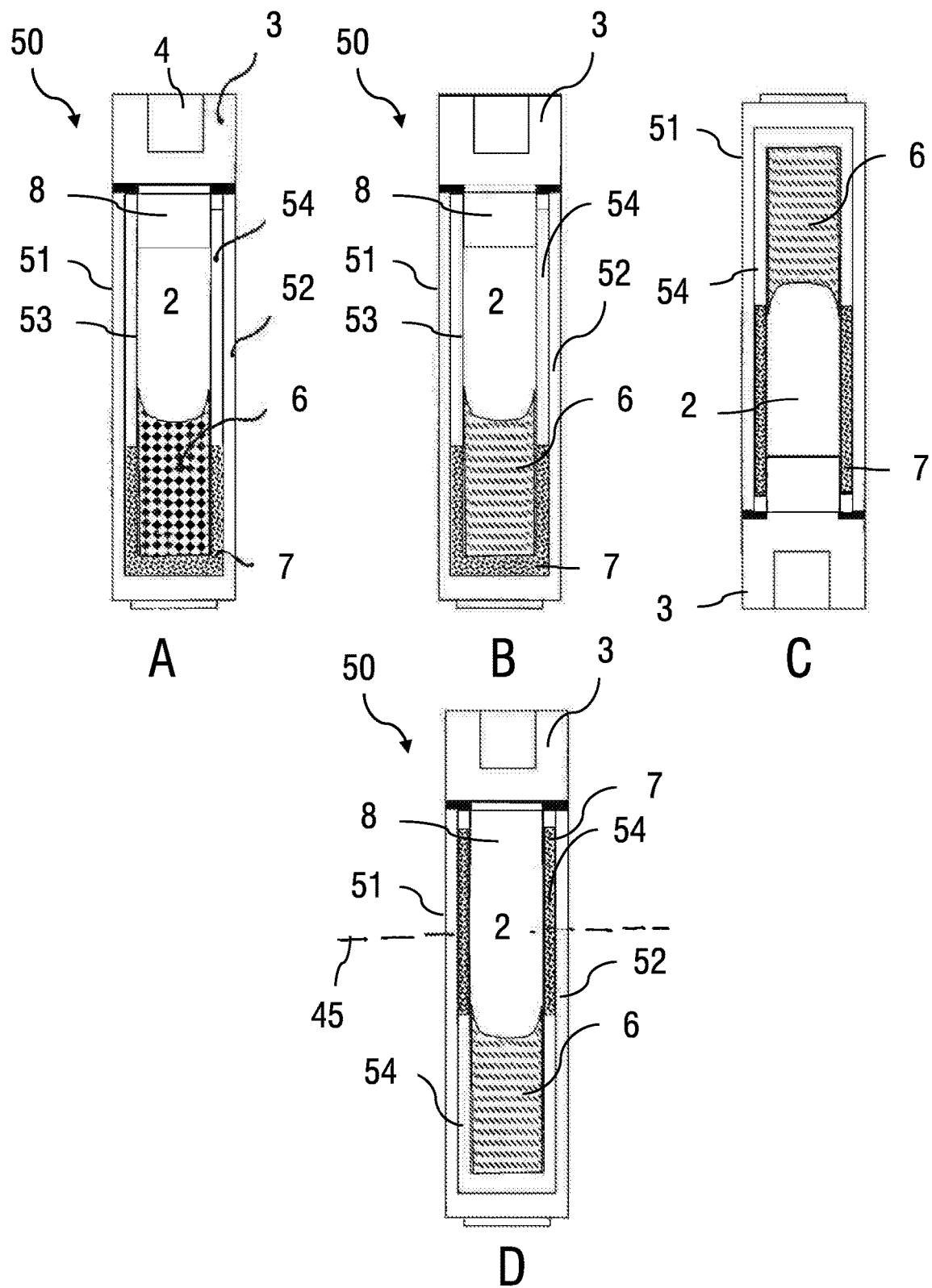

FIG. 5 shows schematic sectional views of a further exemplary embodiment of a device 50 for temperature monitoring of a cryopreserved biological sample. In the case of the exemplary embodiment, chamber 54 for receiving indicator substance 7 is integrated into cryogenic tube 51. Cryogenic tube 51 has in turn a receiving volume (receiving cylinder) 2, into which biosample 6 is inserted, as well as a cover 3. The cover has a shaft 8 which engages into receiving volume 2. The wall of receiving cylinder 2 is embodied to be double-walled, having an outer wall 52 and an inner wall 53, which forms a wall volume 54 in which indicator substance 7 is located. Device 50 with sample 6 is thus frozen as follows:

Freezing to a temperature below the freezing point of biosample 6 (generally −20° C.) is performed in the position of cryogenic tube 51, as shown in FIG. 5A. The state as shown in FIG. 5B is produced. Now frozen biological sample 6 with still liquid indicator substance 7 is moved out of the position in FIG. 5B by 180° rotation into the position as shown in FIG. 5C and further cooled below the freezing point of indicator substance 7. If the melting temperature of indicator substance 7 has been selected e.g. with −60° C., sample 6 can then be moved back into the starting position of FIG. 5A below this temperature and after solidification of both liquids, as a result of which the state according to FIG. 5D is produced. Frozen indicator substance 7 is now located at the top and frozen biosample 6 is located at the bottom in cryogenic tube 51. If the melting temperature of −60° C. is undershot, this is apparent from the fact that both liquids are again located as represented in FIG. 1A in the lower cylinder region. This can also be detected via an optical transmission or scattered light measurement, etc., which is illustrated on the basis of dashed beam path 45 in FIG. 5D. Coloring of indicator substance 7 is expedient for manual operation.

Figure 6:
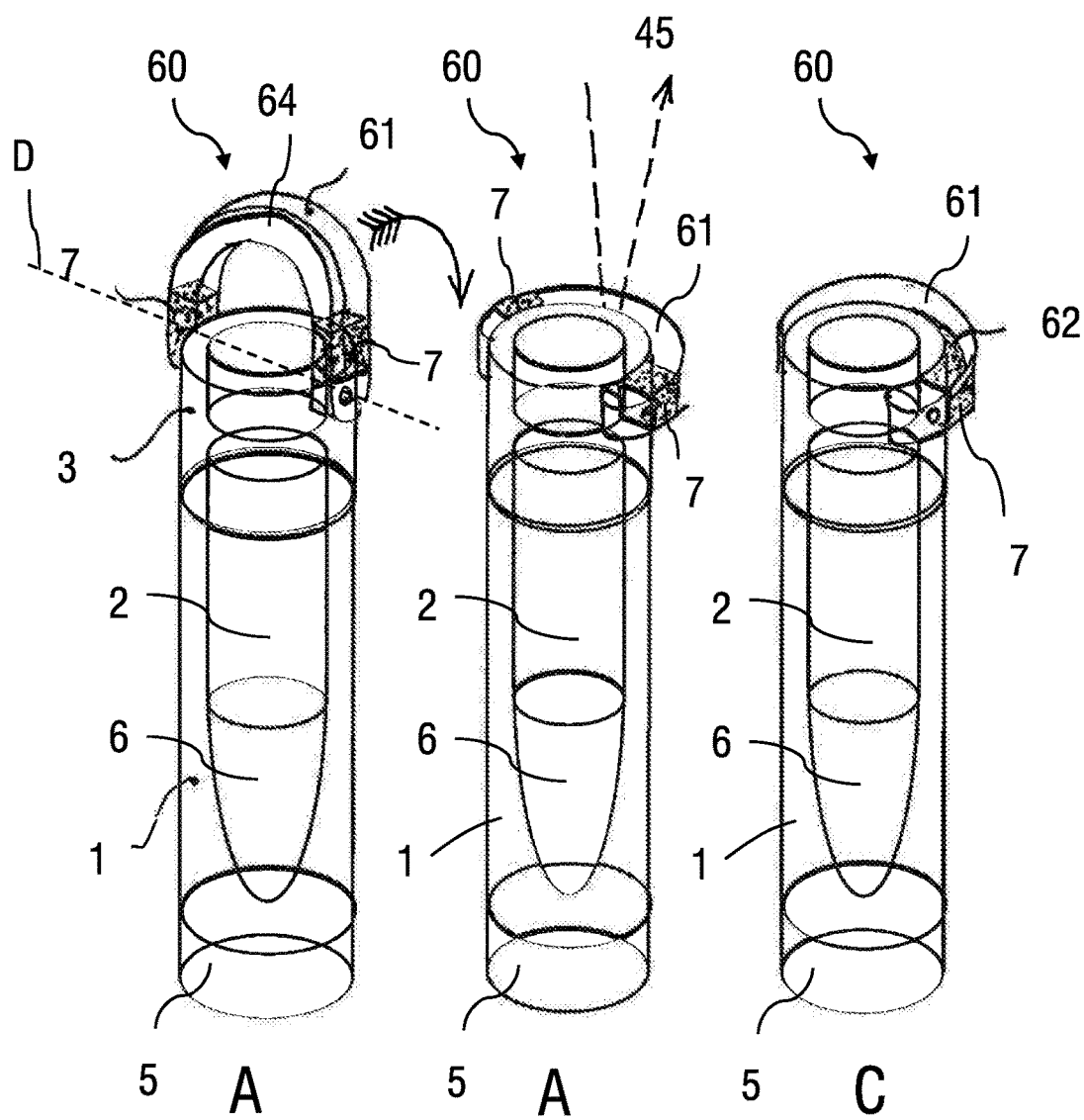

The views of FIG. 6 show schematic views of a further device 60 for temperature monitoring of a cryopreserved biological sample. One particular feature of this embodiment variant lies in the fact that the container, which is partially filled with an indicator substance 7, is embodied as a semi-annular hollow body 61. Semi-annular body 61 is fastened pivotably at its two ends to cover 3 of a cryogenic tube 1, and indeed about an axis of rotation D which runs perpendicular to a longitudinal axis of cryogenic tube 1. In the position of FIG. 6A, in which semi-annular body 61 is pivoted into a vertical position, device 60 is frozen to the storage temperature. Indicator substance 7 flows still in the liquid assembly state as a result of gravity to the two lowest points in upright semi-annular body 61 and is located to the right and left directly above axis of rotation D. Indicator substance 7 freezes there. In the deep-frozen state, semi-annular body 61 is then moved into a horizontal position as represented in FIG. 6B.

An optical measurement can very easily be made from above on this semi-circular body 61, which optical measurement shows whether indicator substance 7 is still located in the original position or, as shown in FIG. 6C, has spread in annular base 62. In this case, the melting point of indicator substance 7 has been exceeded at some point in time. A flat side of semi-annular body 61 can also be mirrored so that optical measurement beam 45 is reflected if indicator substance has not spread.

Figure 7:
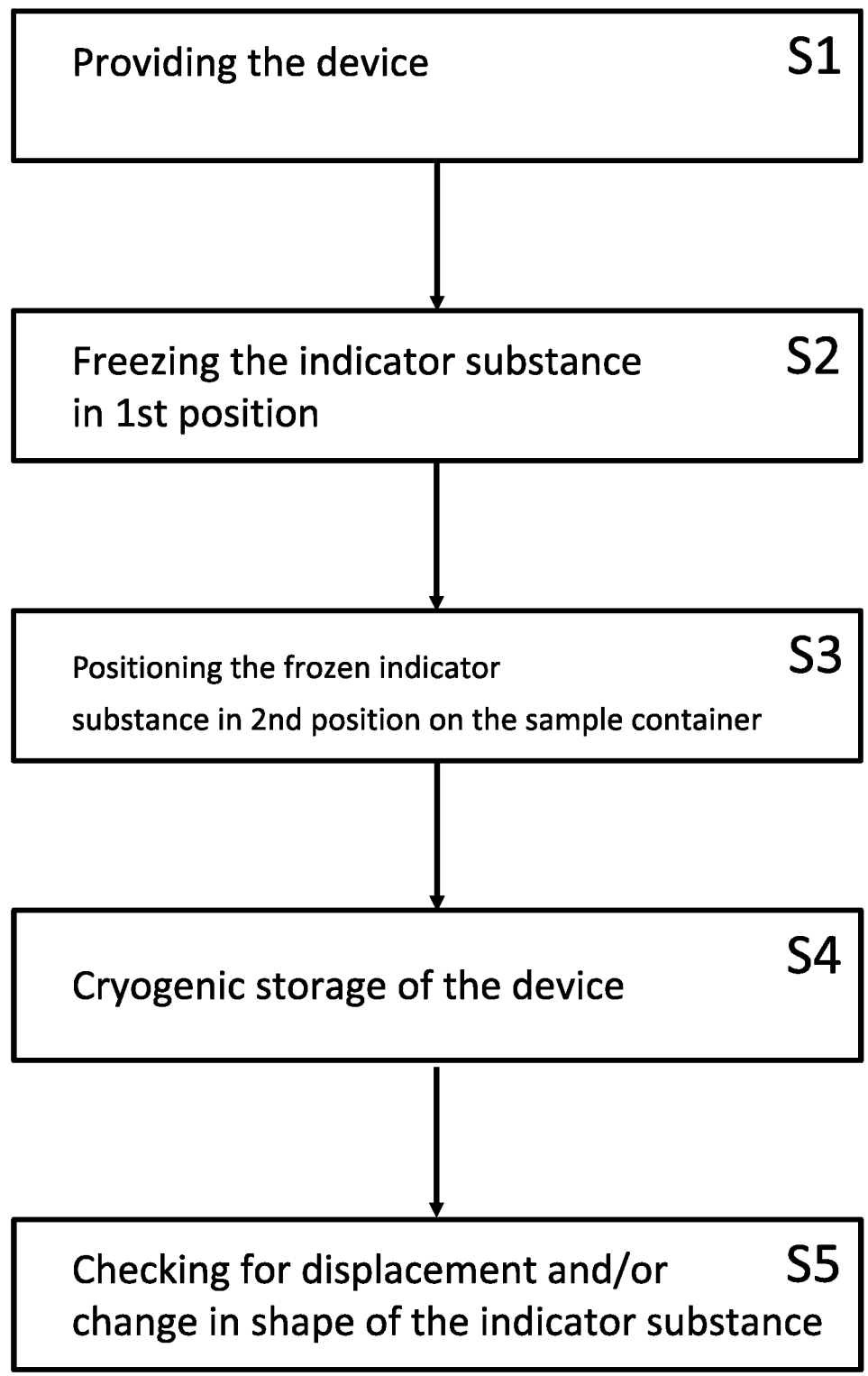
FIG. 7 shows a flow chart to illustrate an exemplary embodiment of a method for temperature monitoring of a cryopreserved biological sample.

FIG. 7 illustrates on the basis of a flow chart a method for temperature monitoring of a cryopreserved biological sample. In step S1, a device for temperature monitoring is provided, for example, one of devices 10, 20, 30, 30c, 40, 50 or 60. In this case, depending on the temperature threshold value which is supposed to be monitored in the case of cryogenic storage, a suitable liquid or a liquid mixture is to be selected as indicator substance 7.

Via the selection of suitable liquids and the mixture ratio of liquids, their melting point can be set to a desired value in a range from −20° C. to −140° C.

Figure 8A:
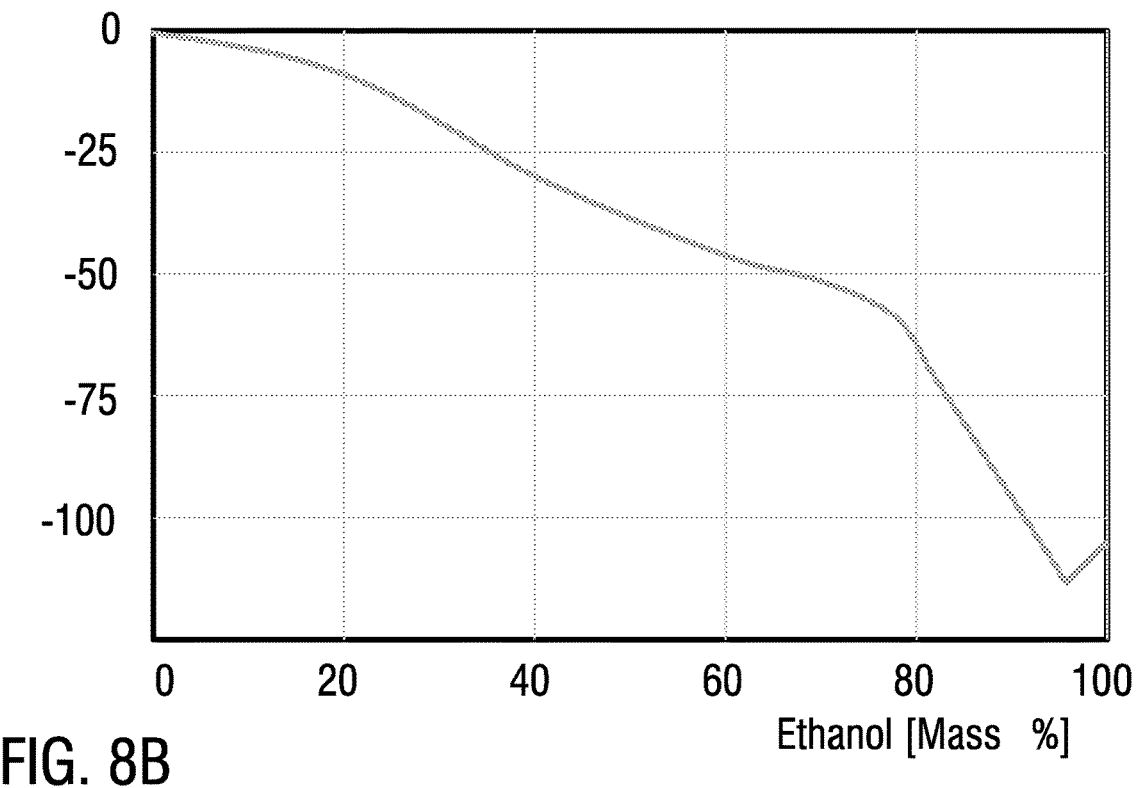
FIGS. 8A, 8B, 9A show in each case a melting diagram of a liquid mixture.
Figure 8B:
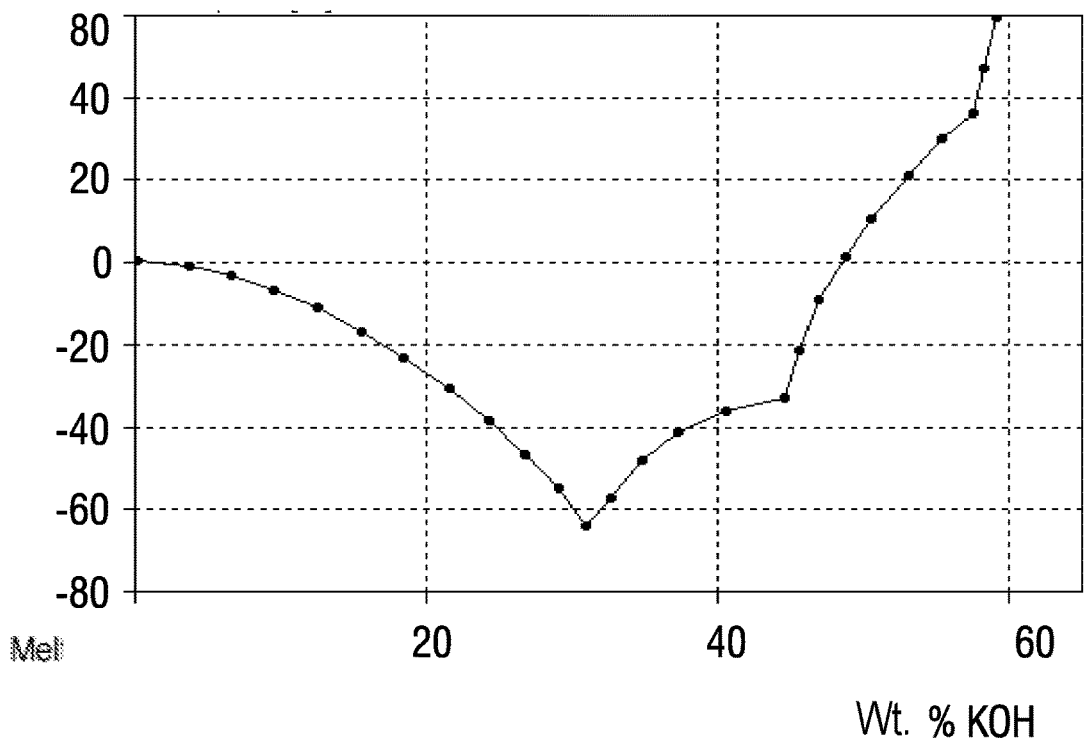
Figures 9A, 9B:
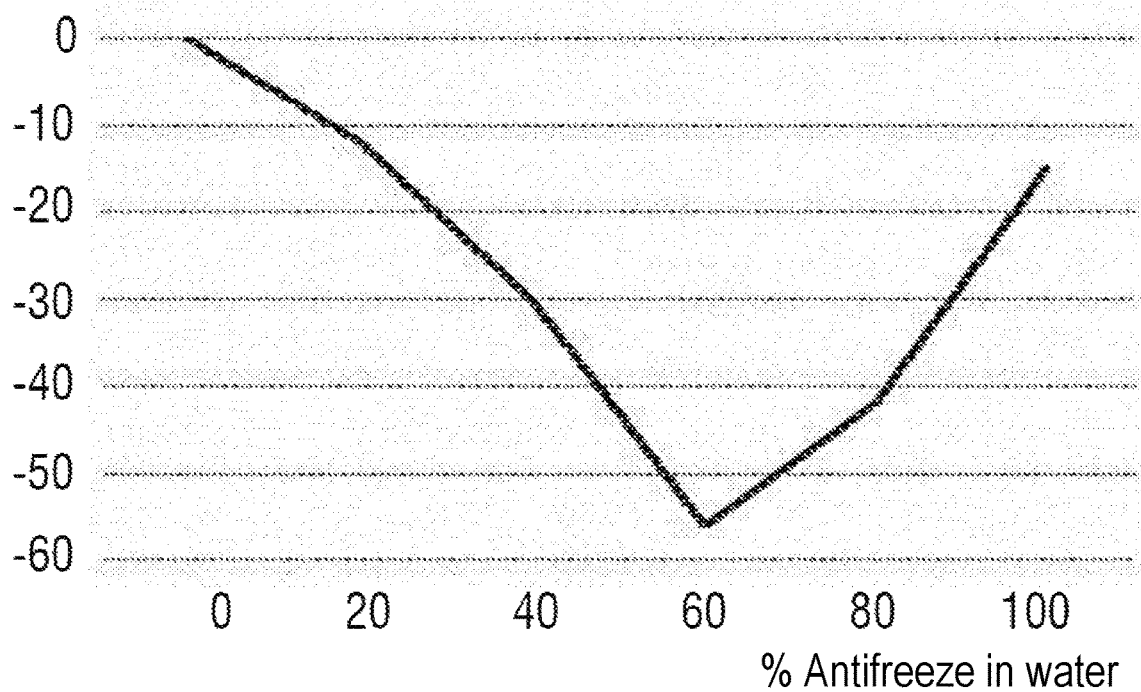
FIG. 9B shows a table with melting points of a number of pure liquids.

By way of example, FIG. 8A indicates the profile of the melting point as a function of the mixture ratio of an alcohol and water, with which, in the case of a moderate increase in viscosity with falling temperature, a temperature range between 0° C. and −118° C. can be covered. Should e.g. a temperature threshold value of −118° C. be monitored, the ethanol ratio can be set at 93.5%. Melting points up to a value of slightly below −60° C. can also be set by adding potassium hydroxide (KOH) to water, which is shown in FIG. 8B on the basis of a melting diagram. A mixture of water and antifreeze can also be used as the indicator substance, which is illustrated by the melting diagram of FIG. 9A. The table of FIG. 9B lists freezing points/melting points of further pure liquids which can be used on their own or as a mixture with another liquid as the indicator substance. Further liquid mixtures which are suitable as the indicator substance include chloroform/cyclohexane mixtures or other mixable liquids which can be inferred e.g. from the mixability matrix of solvents of FIG. 10.

Liquids and plastic materials with good wettability and low viscosity at low temperatures are primarily selected in order to configure the change in position to be as extensive as possible and the additional compartment as small as possible.

If several temperature threshold values are supposed to be monitored during cryogenic storage or if the achieved temperature intervals which the sample reaches should be restricted more precisely, several different indicator substances with different melting points can correspondingly be used which are then arranged in different chambers in the sample container.

In step S2, the indicator substance in the chamber is then frozen, wherein the chamber is moved into a first position during freezing of the indicator substance. In the case of different indicator substances and several chambers, these are moved in an analogous manner in each case into a first position and frozen.

Thereafter, in step S3, the at least one chamber with the frozen indicator substance is moved into a second position and, if the chamber is not yet arranged on the sample container, arranged thereon. The second position changes the spatial position of the frozen indicator substance at least to such an extent that a melting after the change in position leads to a visible displacement of the liquid or its delimiting geometry in the chamber.

In this state, the device can be stored with a cryosample in the receiving space of the sample container in the case of a storage temperature below the melting temperature (step S4).

It is subsequently possible to check by means of the indicator substance at any desired point in time during the storage process whether an undesirable, if only temporary heating of the cryosample has taken place. To this end, a check is made as to whether an at least partial displacement and/or change in form of the indicator substance(s) caused by a melting process has taken place. If this is the case, an exceeding of the threshold temperature(s) to be monitored can be concluded.

Although the invention has been described with reference to specific exemplary embodiments, it is apparent for a person skilled in the art that various changes can be made and equivalents can be used as a replacement without departing from the scope of the invention. The invention should consequently not be restricted to the disclosed exemplary embodiments, but rather should enclose all the exemplary embodiments which fall into the scope of the enclosed claims. In particular, the invention also claims protection for the subject matter and the features of the subordinate claims independently of the claims referred to.

LIST OF REFERENCE NUMBERS

1 Sample container, e.g. cryogenic tube
2 Receiving volume
3 Cover
4 Engagement
5 Base
6 Biosample, e.g. cell suspension
7 Indicator substance
8 Shaft
10 Device for temperature monitoring
11 Cap
12 Outer wall
13 Inner wall
14 Wall volume
15 Cap tip
16 Lower cap region
20 Device for temperature monitoring
21 Double-walled push-on part
22 Outer wall
23 Inner wall
24 Wall volume
24a Partial volume
24b Partial volume
25 Separating wall
26 Second indicator substance
30 Device for temperature monitoring
30c Device for temperature monitoring
31 Annular body
32 First partial volume
33 Second partial volume
34 Inner volume
36 Adhesion part
40 Device for temperature monitoring
41 Container
42 First partial volume
43 Second partial volume
44 Inner volume
45 Measurement beam
46 Bending part
50 Device for temperature monitoring
51 Container, e.g. cryogenic tube
52 Outer wall
53 Inner wall
54 Wall volume
60 Device for temperature monitoring 61 Semi-annular body
62 Semi-annular base
63 Axis of rotation
64 Inner volume
D Axis of rotation

The invention claimed is:

1. A device for temperature monitoring of a cryopreserved biological sample, comprising:
   a) a sample container comprising a sample reservoir, the sample reservoir being a receiving space for receiving a biological sample; and
   b) at least one chamber comprising an inner space which is not fluidically connected to the receiving space and is only partially filled with an indicator substance, such that the indicator substance cannot come in direct contact with a biological sample located in the receiving space, wherein the melting temperature of the indicator substance lies in a range from −20° C. to −140° C., and wherein the at least one chamber is formed by a container with one or more cavities which is fastened detachably or pivotably to the sample container.

2. The device according to claim 1, wherein there is a plurality of chambers which are filled in each case only partially with a respective indicator substance, the melting temperature of which lies in a range from −20° C. to −140° C., wherein the indicator substances in the chambers have different melting temperatures.

3. The device according to claim 1, wherein a chamber wall at at least one point is transparent or semi-transparent.

4. The device according to claim 1, further comprising a measuring apparatus which is configured to detect a position of the indicator substance in the at least one chamber.

5. The device according to claim 1, wherein the indicator substance comprises an indicator additive which increases detectability of a physical property of the indicator substance.

6. The device according to claim 1, wherein the container is fastened pivotably to a longitudinal end of the sample container.

7. The device according to claim 1, wherein the container is fastened pivotably to the sample container by a bendable part.

8. The device according to claim 1, wherein the container is fastened pivotably to the sample container about an axis of rotation, which is perpendicular to a longitudinal axis of the sample container.

9. The device according to claim 1, wherein the container
   a) is semi-annular or annular; and
   b) can be moved into a first pivot position, in which it is arranged coaxially with respect to a longitudinal axis of the sample container, and into a second pivot position which is rotated by at least 45° with respect to the first pivot position.

10. The device according to claim 1, wherein
   a) the container is an elongated hollow body which is fastened pivotably indirectly or directly to the sample container at a longitudinal end of the sample container; and/or
   b) the container can be moved into a first pivot position, in which a longitudinal axis of the container runs parallel to a longitudinal axis of the sample container, and can be moved into a second pivot position, which is rotated by at least 45° in comparison with the first pivot position.

11. The device according to claim 1, wherein the sample container has a cover for closing off the receiving space and the container is fastened detachably or pivotably to the cover.

12. The device according to claim 1, wherein the sample container is a cryogenic tube.

13. The device according to claim 1, wherein the indicator substance comprises at least one alcohol selected from the group consisting of octan-1-ol, nonan-1-ol, propane-1,2-diol, propane-1,3-diol, butane-1,2-diol, butane-1,3-diol, butane-2-ol, pentane-1,5-diol, pentan-1-ol, cyclopentanol and benzyl alcohol as well as optionally at least one dye.

14. The device according to claim 13, wherein the at least one dye is selected from the group consisting of triphenylmethane dyes, rhodamine dyes, azo dyes, phenazine dyes and phenothiazine dyes.

15. The device according to claim 13, wherein the indicator substance comprises at least two alcohol components selected from the group consisting of octan-1-ol, nonan-1-ol, propane-1,2-diol, propane-1,3-diol, butane-1,2-diol, butane-1,3-diol, butane-2-ol, pentane-1,5-diol, pentan-1-ol, cyclopentanol, and benzyl alcohol and/or the indicator substance comprises at least one dye selected from the group consisting of oil red, methyl red, brilliant green, rhodamine B, neutral red, and methylene blue.

16. A device for temperature monitoring of a cryopreserved biological sample, said device comprising:
   a) a sample container comprising a sample reservoir, the sample reservoir being a receiving space for receiving a biological sample; and
   b) at least one chamber, comprising an inner space which is not fluidically connected to the receiving space and is only partially filled with an indicator substance, such that the indicator substance cannot come in direct contact with a biological sample located in the receiving space, wherein the melting temperature of the indicator substance lies in a range from −20° C. to −140° C., and wherein the at least one chamber is formed by a double-walled push-on part.

17. The device according to claim 16, wherein the double-walled push-on part is a double-walled cap which can be pushed onto the sample container at a longitudinal end of the sample container.

18. The device according to claim 16, wherein the sample container is a cryogenic tube and the double-walled push-on part can be pushed, glued or slid onto an outer shell surface of the cryogenic tube and at least partially engages around it in a pushed-on state.

19. A device for temperature monitoring of a cryopreserved biological sample, the device comprising a sample container with a receiving space for receiving a biological sample, and at least one chamber, the inner space of the at least one chamber is not fluidically connected to the receiving space and is only partially filled with an indicator substance, wherein the melting temperature of the indicator substance lies in a range from −20° C. to −140° C., wherein the receiving space of the sample container for the formation of the at least one chamber is double-walled with an inner wall and an outer wall, and wherein an intermediate space between the inner wall and the outer wall is partially filled with the indicator substance.

20. A method for temperature monitoring of cryopreserved samples, comprising the steps:
   a) providing a device for temperature monitoring of a cryopreserved biological sample, the device comprising a sample container with a receiving space for receiving a biological sample, and at least one chamber, the inner space of the at least one chamber is not fluidically connected to the receiving space and is only partially filled with an indicator substance, and wherein the melting temperature of the indicator substance lies in a range from −20° C. to −140° C.;

b) freezing the indicator substance, wherein the at least one chamber
  is moved into a first position during freezing of the indicator substance and
  thereafter is moved into a second position in which a melting of the indicator substance leads, as a result of an influence of gravity, to an at least partial displacement and/or change in shape of the indicator substance in the at least one chamber.

21. The method according to claim 20, wherein a substance is selected as the indicator substance, a melting temperature of which or a threshold temperature of which, at which a viscosity of melted indicator substance exceeds a determined setpoint value, corresponds to a predetermined threshold temperature, the exceeding of which is monitored.

22. The method according to claim 21, further comprising
a) storing of the device with a cryopreserved sample in the sample container, wherein the at least one chamber is arranged in the second position on the sample container; and
b) ascertaining whether an at least partial displacement and/or change in shape of the indicator substance performed by temporarily exceeding the melting temperature of the indicator substance has taken place.

* * * * *